(12) United States Patent
Landmesser et al.

(10) Patent No.: US 6,213,535 B1
(45) Date of Patent: Apr. 10, 2001

(54) ARTICULATING CLOSURE

(75) Inventors: Franklin Darrel Landmesser; Leon F. Van Eden, both of Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/490,530

(22) Filed: Jan. 25, 2000

(51) Int. Cl.⁷ .................................................... B60J 5/04
(52) U.S. Cl. ........................ 296/146.12; 296/202; 49/246
(58) Field of Search ............................. 296/146.12, 202; 49/246, 248

(56) References Cited

U.S. PATENT DOCUMENTS

| 3,313,063 | * | 4/1967 | Patin ........................... 296/146.12 X |
| 4,014,585 | * | 3/1977 | Earnhart ................................. 296/16 |
| 4,505,500 | | 3/1985 | Utsumi et al. ......................... 292/48 |
| 4,561,690 | | 12/1985 | Shinjo et al. ......................... 296/155 |
| 4,930,836 | * | 6/1990 | Grinn ............................... 296/183 X |
| 5,244,247 | | 9/1993 | Kuwabara ....................... 296/146.12 |
| 5,398,988 | | 3/1995 | DeRees et al. ...................... 296/155 |
| 5,491,875 | | 2/1996 | Siladke et al. ......................... 16/346 |
| 5,632,065 | | 5/1997 | Siladke et al. ......................... 16/335 |
| 5,871,255 | | 2/1999 | Harland et al. ...................... 297/257 |
| 6,030,024 | * | 2/2000 | Schmidhuber et al. ........ 296/146.12 |

FOREIGN PATENT DOCUMENTS

| 2103533 | * | 9/1971 | (DE) ...................................... 49/248 |
| 1294888 | * | 4/1962 | (FR) ...................................... 49/248 |
| 824780 | * | 12/1959 | (GB) ...................................... 49/248 |
| 902405 | * | 8/1962 | (GB) ...................................... 49/248 |

OTHER PUBLICATIONS

"From 4–door to more–door", Automotive News, p. 1 Mar. 27, 2000.

US Serial No. 09/490,578 entitled: "Hinge System" filed Jan. 25, 2000.

* cited by examiner

Primary Examiner—Dennis H. Pedder
(74) Attorney, Agent, or Firm—Jeffrey A. Sedlar

(57) ABSTRACT

A vehicle access system includes an access opening for the passenger compartment that is closed by a swinging door in combination with an articulating door. The articulating door moves through an arc without angling away from the vehicle body and is supported on a hinge assembly that attaches near the center of the door. An arm assembly guides the door throughout its range of positions and maintain the door in an orientation that is substantially parallel to the vehicle body. When the doors are open, an uninterrupted access opening is provided to the area of the second and third seat rows of the vehicle.

18 Claims, 4 Drawing Sheets

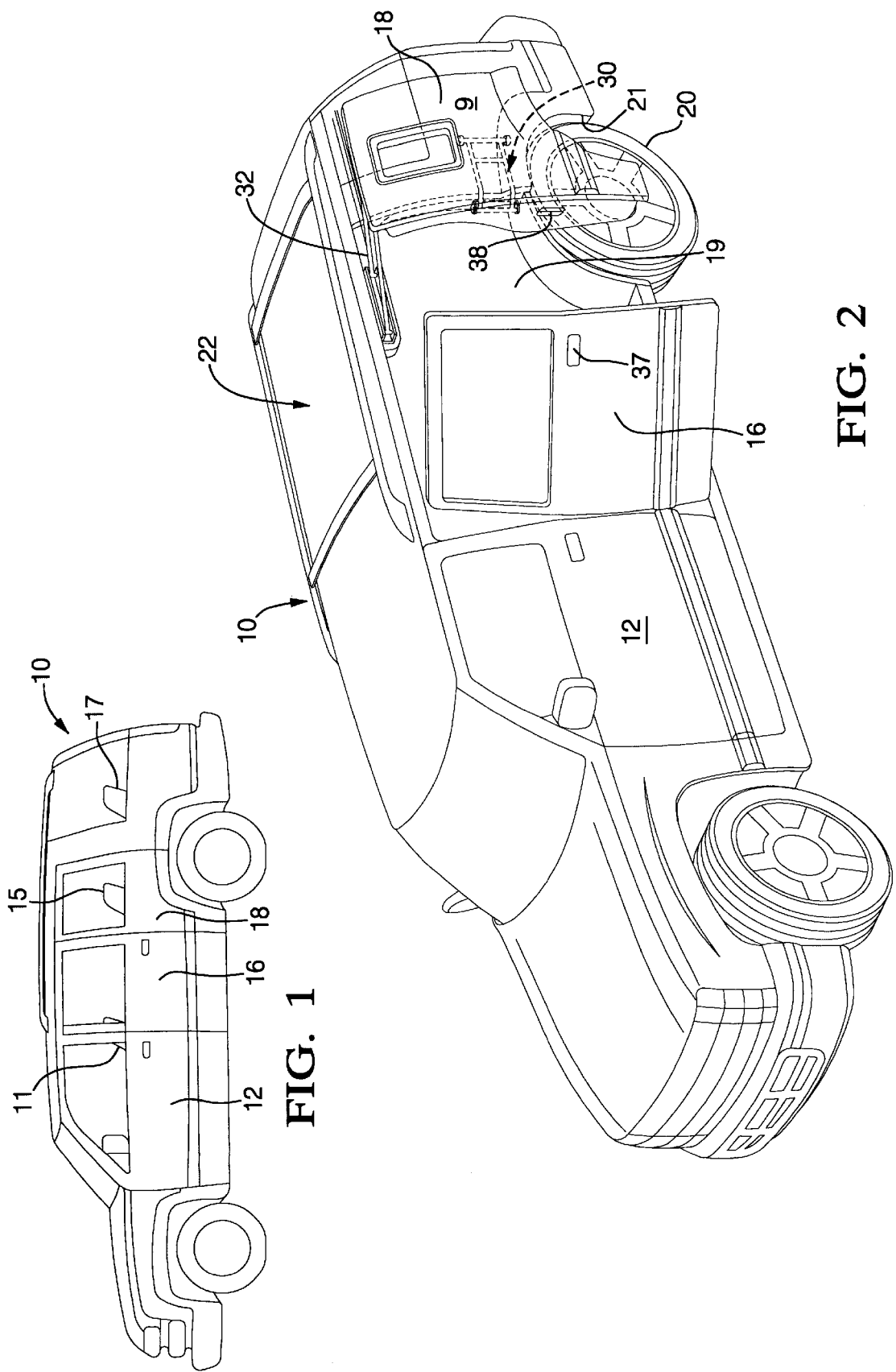

US 6,213,535 B1

ARTICULATING CLOSURE

TECHNICAL FIELD

The present invention relates to an articulating closure and more particularly, to a hinge system that improves vehicle accessibility in general but especially in the cases of vehicles with multiple rows of passenger seats and vehicles with a rear storage area.

BACKGROUND OF THE INVENTION

Vehicle accessibility has been an ever present design challenge since modes of human transportation began using enclosed bodies. Countless closure mechanisms have been invented to solve the persistent problem. The factors influencing the solution that is available for a given vehicle include exterior styling, interior usage, opening size, location of the opening on the vehicle body, and many others. In the case of side door openings on a typical multi-passenger vehicle, the generally used solution is to employ a single closure per opening that is separated from any adjacent closures by a pillar. Each closure has two single pivoting hinges placed at the front or rear end of the door to swingingly connect the door to the body, with both hinges supporting the weight of the door. A commonly used rule of thumb is to place the hinges with at least fifteen inches of separation between them to control gaps. Generally, a single latch is used at the opposite end of the door from the hinges to releasably hold the door in a closed position on the body.

Apart from the generally employed closure scheme, other means that have been developed include the double pivot door hinge of U.S. Pat. No. 5,632,065 and the double latching mechanism of U.S. Pat. No. 4,561,690. Both of these options have been used in the context of a double door closure scheme without a central opening pillar. That type of a system has been recognized as advantageous from an accessibility convenience standpoint. In spite of those references, the generally pursued option for closures on vehicles with multiple rows of seats has been to provide single doored openings with standard type hinges and to provide a means of manipulating the seats to aid in access. A reference showing that type of solution is U.S. Pat. No. 5,871,255.

Summarizing, the state of the art presently teaches that most vehicles include side doors that pivotably open on twin hinges that are connected to the vehicle body. Further, when multiple side doors are employed, all doors usually open in the same general direction. A well known exception is van type vehicles that commonly include sliding rear side doors to improve accessibility to multiple rows of rear seats. That system is much like the one used in the '690 patent referenced above, (with a center pillar). Therefore, in the design process, if one where to stray from the common swinging door scheme, the prior art provides strong motivation for employing sliding rear doors. Venturing beyond that option remains unpredictable.

SUMMARY OF THE INVENTION

Aspects of the present invention reside in a closure system for articulating a door through an arc while maintaining the door in an orientation that substantially faces the same direction throughout a full closed to open excursion. A preferred exemplary embodiment described here as an aid in readily conveying the nature of the invention includes a closure system with a dual pivot mechanism that suspends the mass of the closure and allows for fore-aft and up-down positioning of the closure. The closure system also includes a second arm preferably in the form of an upper control arm assembly with a pair of links that stabilize the closure during its articulating motion and assist in positioning the closure to arrive at the required gaps. The resulting open position of the closure is near and parallel to the side of the associated body.

The numbered claims found at the conclusion of this specification particularly and distinctly define the subject matter of the invention per se.

BRIEF DESCRIPTION OF THE DRAWINGS

The present invention will now be described by way of example, with reference to the accompanying drawings in which:

FIG. 1 is a side elevation of a vehicle including the articulating closure system of the present invention.

FIG. 2 is a perspective view of the vehicle of FIG. 1 with the articulating closure system in an open condition.

DESCRIPTION OF THE PREFERRED EMBODIMENT

Figure 3:
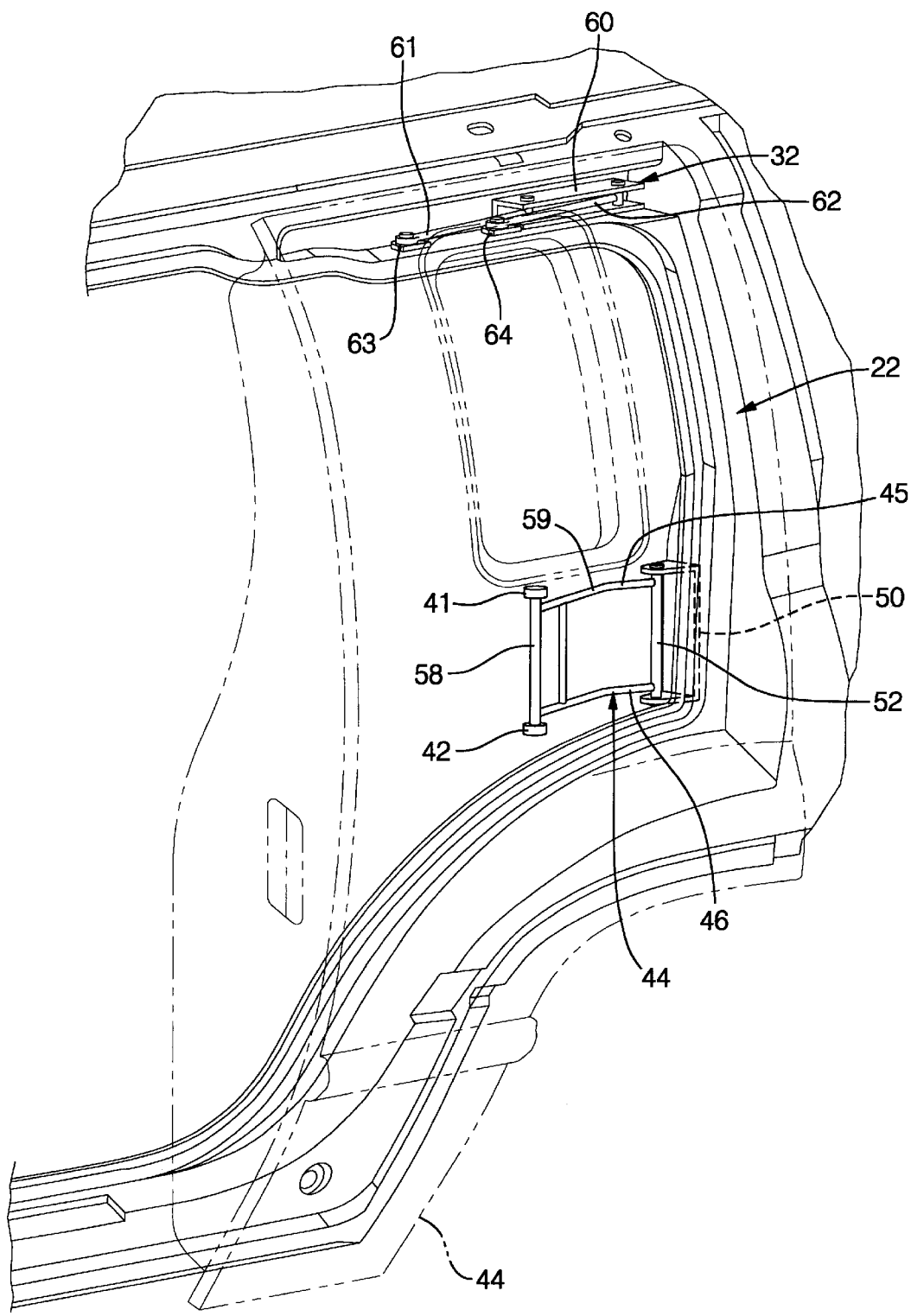
FIG. 3 is a fragmentary perspective detail illustration of the articulating door area of the vehicle of FIG. 1 shown in a closed condition.

The vehicle access system of the present invention is disclosed in a preferred embodiment that is in essence a "six-door" vehicle. The fifth and six doors cooperate with the third and fourth doors respectively, to close relatively large side openings by employing a unique hinge system for an articulating closure concept. The enlarged side openings provide convenient access to the second and third seat row areas for both passenger and cargo uses. This application is related to commonly assigned U.S. patent application (Attorney Docket No. GP-300193), filed concurrently herewith and entitled Hinge System, application Ser. No. 07/440, 578 which is specifically incorporated herein by reference.

Referring to FIG. 1, vehicle 10 includes a passenger compartment in its interior with a front or first row of seats 11 for carrying a driver and other passenger(s) that is accessed in a conventional manner by a swinging front door 12. A similar door (not shown), is provided on the opposite side of the vehicle 10. The front door 12 opens generally outwardly and forwardly in a swinging action, pivoting about a pair of hinges in a conventional manner. A second row of seats 15 and a third row of seats 17 are accessed through a combination of a rear door 16 and an articulating door 18. The rear door 16 and the articulating door 18 together close a single uninterrupted opening 19 in the vehicle 10. A similar pair of doors (not shown), are provided on the opposite side of the vehicle 10 so that there is a total of six side doors. The rear door 16 opens generally outwardly and forwardly in a swinging action, pivoting about a pair of hinges in a conventional manner, which is demonstrated in FIG. 2. The articulating door 18 opens generally rearwardly and outwardly as shown in FIG. 2 in an articulating action. In the illustrated open position, the articulating door 18 is substantially parallel to the fore-aft direction of vehicle 10 rather than being positioned at an angle thereto, as is the door 16.

FIG. 2 shows the uninterrupted opening 19 of vehicle body 22, with the doors 16 and 18 in an open position.

Uninterrupted opening 19 extends along the side of vehicle 10 from a point near the rear of front door 12 to a point over the area near the center of wheel 20, including along approximately half the length of the perimeter of the rear wheel house opening 21. No vertical pillar is provided at the juncture between doors 16 and 18. As can be seen from FIG. 2, the combination of doors 16 and 18 provides a large convenient opening for accessing the interior of vehicle 10. Since the door 16 has a relatively short width for the size of the opening 19 and the door 18 moves to the open position without angling relative to the body 22, the vehicle 10 is easily accessed within the often tight quarters of a typical parking lot space. Door 12 being wider than door 16, door 16 can swing open to a larger angle if desired. To access the passenger compartment from outside the vehicle 10, the door 16 is first opened by using handle 37 and swinging the door 16 outwardly and forwardly. Then, the handle 38 may be reached to open door 18 articulating the door 18 rearwardly and outwardly. During its travel, door 18 remains substantially in the same orientation relative to the vehicle 10, meaning it doesn't pass through a range of angular orientations relative to the vehicle body as does the door 16. In other words, the exterior panel 9 of the door 18 always faces the same direction away from the body 22.

The articulating motion of the door 18 is provided through a combination of a dual pivot mechanism 30 that suspends the mass of the door 18 and allows for fore-aft and up-down positioning, and a second arm as an upper or lower link that controls motion of the door. In this case an upper link is provided in the form of control arm assembly 32 that stabilizes the door 18 during its articulating motion and assists in achieving the required gaps upon closing. The dual pivot mechanism 30 pivotably attaches to the body 22 and to the door 18 near its front-to-rear center. The upper control arm assembly 32 pivotably attaches to the body 22 and to the door 18 substantially along its upper edge. In other applications, such as with a wider door, instead of control arm assembly 32, a second arm of pivot length equal to the dual pivot mechanism 30 is used. With a wider door, adequate front-to-back separation can be achieved between the pivots for good path control. The second arm can be located near the top or the bottom of the door depending on packaging requirements.

Referring to FIG. 3, the articulating door 18 is shown in a closed condition with the system details visible. The dual pivot mechanism 30 mechanically links the articulating door 18 to the body 22 of vehicle 10 and includes a central support link 44 comprising a pair of structural members 45 and 46 connected together by a vertical member 47 that is welded to the structural members 45, 46 at its upper and lower ends, respectively. The support link 44 suspends the mass of articulating door 18 and serves to place it in a proper position, bearing the stress imposed thereby. Dual pivot mechanism 44 includes a pivot element 52 connected to the structural members 45,46 and which is pivotably mounted to the body 22 by a bracket 50. The bracket 50 serves to securely hold the dual pivot mechanism to the body 22 while allowing a large range of unrestricted movement of the system. Dual pivot mechanism 44 also includes a second pivot element 58 connected to the structural members 45, 46 and which is pivotably mounted to the articulating door 18 by a pair of supports 41, 42 which may be made as part of a single integrated component. The dual pivot mechanism 30 advantageously includes an offset 59, which places the pivot element 58 further outboard than the pivot element 52. The amount of the offset is variable, depending on the exact mounting location chosen on the body 22 and on the sheet metal contour of the inner panel of articulating door 18, but the preferred result is that the pivot axis at pivot element 58 be a minimum of thirty millimeters outboard from the pivot axis at pivot element 52 to facilitate in initial opening movement of the articulating door 18. The pivot length between the pivot axis at pivot element 52 and the pivot axis at pivot element 58 determines the arcuate path of the articulating door 18 and is selected to comport with the design parameters and to achieve the desired full open position.

The system also includes the preferred upper control arm assembly 32 including mounting bracket 60, arms 61, 62 and brackets 63, 64 that are optionally provided as part of a single integrated component within the scope of the present invention. The arms 61, 62 are of equal length and are pivotably connected to the mounting bracket 60 and to the brackets 63, 64 respectively, by pins to form a four-bar linkage system. The pivot lengths of the arms 61, 62 are equal to the pivot length of the dual pivot mechanism 30. This results in a smooth arcuate path for the articulating door between its open and closed positions. In one optimized embodiment for a given application, the pivot lengths equal one-half the door width at its widest point to achieve a full open position where the door front edge is substantially directly outboard from the door opening's rear edge. Preferably, the dual pivot mechanism 30 attaches to the door at the middle of its width at its widest point or at the center of mass. Optionally, by varying the pivot lengths, the path of the articulating door is tailored for specific complex paths if desired. The upper control arm assembly provides a level of control to the motion of the articulating door 18 above that achieved by the dual pivot mechanism 30 alone. One advantage is in helping to maintain the closed position to achieve critical gap dimensions between the articulating door 18 and the surrounding components of vehicle 10. In particular, the fore-aft location of the upper and lower extremities of the articulating door 18 is controlled because of the spaced distance away from the dual pivot mechanism 30. Additionally, the articulating motion is stabilized by the addition of upper control arm assembly 32. In the closed position shown in FIG. 3, the pivot axis at bracket 63 is a minimum of thirty millimeters outboard from the pivot axis of arm 61 at mounting bracket 60. Similarly, the pivot axis at bracket 64 is a minimum of thirty millimeters outboard from the pivot axis of arm 62 at mounting bracket 60. This assists in initial opening movement of the articulating door 18.

Figure 4:
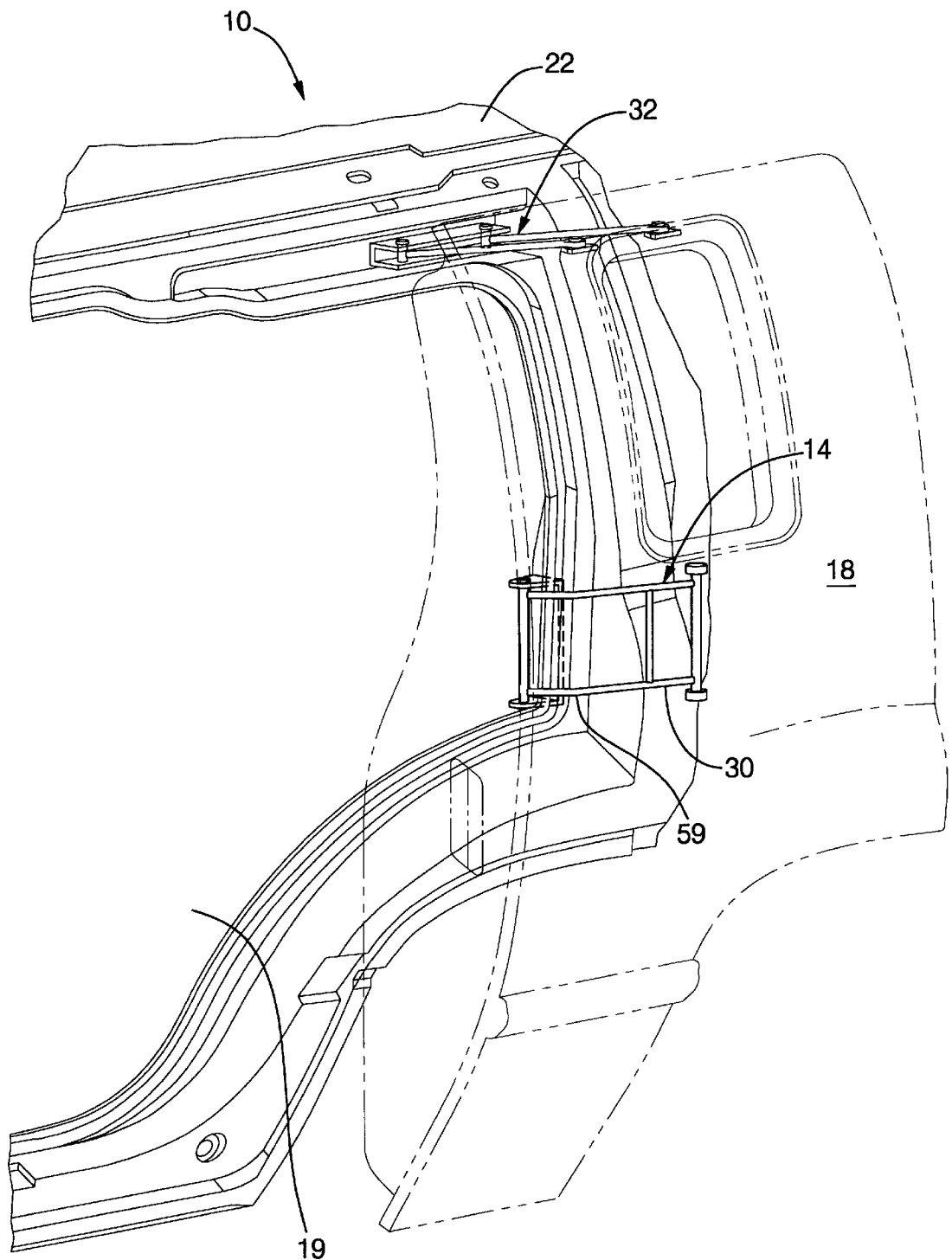
FIG. 4 is a fragmentary perspective detail illustration of the articulating door area of the vehicle of FIG. 1 shown in an open condition.

FIG. 4 illustrates the articulating door 18 in an open condition. The offset 59 in dual pivot mechanism 44 provides clearance so that the articulating door 18 is parked close to the body 22 of vehicle 10. By modification of the system's pivot length and the points of attachment to the body 22 and to the articulating door 18, the full open location is tailorable to maximize access to the opening 19. Setting the pivot axes at vertical provides a smoothly operating system.

Figure 5:
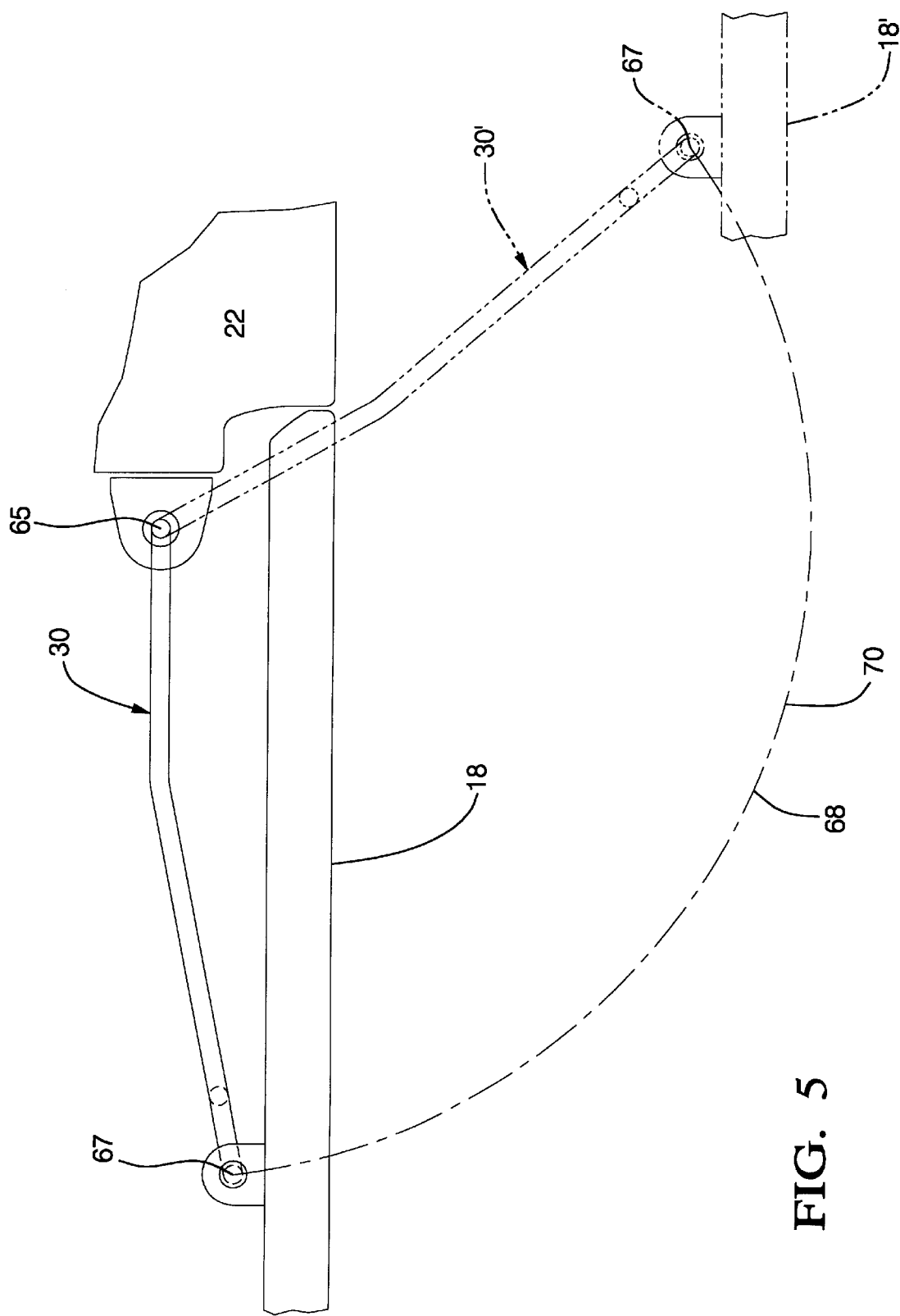
FIG. 5 is a schematic representation of the articulating door's movement.

Referring to FIG. 5, a schematic representation of the movement of articulating door 18 and dual pivot mechanism 30 is shown in the closed position at 18, 30 and in the open position at 18', 30'. Dual pivot mechanism 30 is attached to the body 22 at pivot axis 65 and is attached to the articulating door 18 at pivot axis 67. In the closed position shown at 18, the pivot axis 67 is at least thirty millimeters further outboard relative to the body 22 than the pivot axis 65, which assists the articulating door 18 in moving outboardly upon the release of the associated latching system. This distance of offset has been found advantageous for the present embodiment and may vary for other applications. The pivot axis 67 moves through an arc 68 about the pivot axis 65 that carries the articulating door 18 and places it in an open position at 18' that is closer to the body 22 than the outermost point of the arc 68 in the area of reference numeral 70. The upper control arm assembly 32 (shown in FIG. 4), maintains the articulating door 18 in an orientation such that the outside panel of the door continuously faces substantially directly outboard relative to the body 22.

Thus, the invention has been described in a typical manner by referencing at least one specific embodiment of the many that are possible for an articulating door. The system design is advantageously non-sensitive to body styling due to the attachment and operational features. Improved access to vehicle passenger compartments and storage areas is provided in a competitive manner.

What is claimed is:

1. An articulating closure system comprising:
   a body having an opening;
   an articulating door having a middle area and closing at least part of the opening;
   a dual pivot mechanism pivotably attached to the body about a first pivot axis and pivotably attached to the articulating door near the middle area about a second pivot axis, the dual pivot mechanism supporting the weight of the articulating door on the body; and
   an arm assembly pivotably attached to the articulating door and pivotably attached to the body, and guiding movement of the articulating door so that the articulating door always faces in a substantially constant orientation, wherein the arm assembly includes a first link having a first pivot length and a second link having a second pivot length and wherein the distance between the first pivot axis and the second pivot axis defines a third pivot length and wherein the first, second and third pivot lengths are all equal.

2. An articulating closure system according to claim 1 wherein the second pivot axis is at least approximately thirty millimeters further outboard relative to the body than the first pivot axis when the articulating door is in a closed position.

3. An articulating closure system according to claim 2 wherein the first and second pivot axes are both oriented vertically.

4. An articulating closure system according to claim 1 wherein the articulating door moves through an arc between a closed and a full open position and wherein the arm assembly is positioned near an upper edge of the articulating door.

5. An articulating closure system according to claim 4 wherein the arc has an outermost point that is further outboard relative to the body than the full open position of the articulating door.

6. An articulating closure system according to claim 1 further comprising a swinging door cooperating to close the opening with the articulating door.

7. An articulating closure according to claim 6 further comprising a front door positioned on the body in front of the swinging door, wherein the front door is wider than the swinging door.

8. An articulating closure system comprising:
   a body having an opening that is substantially uninterrupted;
   an articulating door closing a rearward part of the opening;
   a dual pivot mechanism pivotably attached to the body about a first pivot axis and pivotably attached to the articulating door about a second pivot axis, the dual pivot mechanism supporting the weight of the articulating door on the body;
   an upper control arm assembly pivotably attached to the articulating door and pivotably attached to the body, and guiding movement of the articulating door so that the articulating door always faces in a substantially constant orientation; and
   a swinging door having a forward edge and being pivotably attached to the body near the forward edge, the swinging door closing a forward part of the opening, wherein the upper control arm assembly includes a first link having a first pivot length and a second link having a second pivot length and wherein the distance between the first pivot axis and the second pivot axis defines a third pivot length and wherein the first, second and third pivot lengths are all equal.

9. An articulating closure system according to claim 8 wherein the second pivot axis is at least approximately thirty millimeters further outboard relative to the body than the first pivot axis when the articulating door is in a closed position.

10. An articulating closure system according to claim 9 wherein the first and second pivot axes are both oriented vertically.

11. An articulating closure system according to claim 8 wherein the articulating door moves through an arc between a closed and a full open position and wherein the upper control arm assembly is positioned near an upper edge of the articulating door.

12. An articulating closure system according to claim 11 wherein the arc has an outermost point that is further outboard relative to the body than the full open position of the articulating door.

13. An articulating closure system according to claim 12 further comprising a front door positioned on the body directly in front of the swinging door, wherein the front door is wider than the swinging door.

14. An articulating closure system comprising:
   a vehicle including a body having an opening, the opening being substantially uninterrupted and the body including a rear wheel house;
   an articulating door having a rear edge and a forward edge and closing a rearward part of the opening, the rear edge being positioned substantially over the center of the rear wheel house when the articulating door is in a closed position;
   a dual pivot mechanism pivotably attached to the body about a first pivot axis and pivotably attached to the articulating door about a second pivot axis, the dual pivot mechanism supporting the weight of the articulating door on the body;
   an upper control arm assembly pivotably attached to the articulating door and pivotably attached to the body, the upper control arm assembly guiding movement of the articulating door so that the articulating door always faces in a substantially constant orientation as it moves through an arc between the closed position and a full open position, the forward edge of the articulating door being positioned substantially over the center of the rear wheel house when the articulating door is in the full open position; and
   a swinging door having a forward edge and being pivotably attached to the body near the forward edge, the swinging door closing a forward part of the opening, wherein the upper control arm assembly includes a first link having a first pivot length and a second link having a second pivot length and wherein the distance between the first pivot axis and the second pivot axis defines a third pivot length and wherein the first, second and third pivot lengths are all equal.

15. An articulating closure system according to claim 14 wherein the second pivot axis is at least approximately thirty millimeters further outboard relative to the body than the first pivot axis when the articulating door is in the closed position.

16. An articulating closure system according to claim 14 wherein the arc has an outermost point that is further outboard relative to the body then the full open position of the articulating door and wherein the upper control arm assembly is positioned near an upper edge of the articulating door.

17. An articulating closure according to claim 14 further comprising a front door positioned on the body directly in front of the swinging door, wherein the front door is wider than the swinging door.

18. An articulating closure system according to claim 14 wherein the dual pivot mechanism attaches to the articulating door near a front-to-rear center of the articulating door.

* * * * *